United States Patent [19]

Yasui

[11] Patent Number: 4,546,842
[45] Date of Patent: Oct. 15, 1985

[54] SLIDE RAIL TRACK DRIVE SYSTEM FOR A SNOWMOBILE

[75] Inventor: Toshihiro Yasui, Coon Rapids, Minn.

[73] Assignee: Yamaha Hatsudoki Kabushiki Kaisha, Japan

[21] Appl. No.: 498,831

[22] Filed: May 27, 1983

[51] Int. Cl.$^4$ .................... B62D 55/24; B62M 27/02
[52] U.S. Cl. .................. 180/193; 280/21 R; 305/35 R; 305/35 EB
[58] Field of Search ............ 180/193, 190, 185, 9.58, 180/9.24, 9.3, 9.2, 9.56, 9.21, 9.62, 9.25; 280/12 F, 7.12, 8, 670, 21, 13; 305/35 EB

[56] References Cited

U.S. PATENT DOCUMENTS

| Re. 26,775 | 1/1970  | Smieja        | 180/193     |
|------------|---------|---------------|-------------|
| 2,561,716  | 7/1951  | Tucker        | 305/18      |
| 2,702,088  | 2/1955  | Klimek, Jr.   | 180/190     |
| 3,252,533  | 5/1966  | Aeder et al.  | 180/185     |
| 3,480,096  | 11/1969 | Hammitt       | 180/185     |
| 3,509,955  | 5/1970  | Lichfield     | 180/190     |
| 3,721,308  | 3/1973  | Brandli et al.| 180/193     |
| 3,722,961  | 3/1973  | Haley et al.  | 180/190 X   |
| 3,738,714  | 6/1973  | Ness          | 180/193 X   |
| 3,750,775  | 8/1973  | Valentine     | 180/193     |
| 3,773,126  | 11/1973 | Irvine        | 180/9.58    |
| 3,840,083  | 10/1974 | Woods         | 180/190 X   |
| 3,877,534  | 4/1975  | Krause        | 180/193     |
| 3,887,243  | 6/1975  | Chaumont      | 180/193 X   |
| 3,944,006  | 3/1976  | Lassanske     | 180/9.62    |
| 4,023,865  | 5/1977  | Morissette    | 305/35 EB   |
| 4,116,496  | 9/1978  | Scott         | 180/190 X   |
| 4,217,006  | 8/1980  | Dehnert       | 305/35 EB   |
| 4,301,884  | 11/1981 | Taylor        | 180/190     |
| 4,407,386  | 10/1983 | Yasui et al.  | 180/193     |
| 4,434,867  | 3/1984  | Grinde        | 180/9.56 X  |

Primary Examiner—Joseph F. Peters, Jr.
Assistant Examiner—Mitchell J. Hill
Attorney, Agent, or Firm—Orrin M. Haugen; Thomas J. Nikolai; Douglas L. Tschida

[57] ABSTRACT

A snowmobile track drive system wherein the track drive sprockets and idler wheels are mounted to a hollow framed enclosure interior to the track. Slide rails are also mounted to the edges of the enclosure and about which the endless track revolves. The hollow enclosure is further pivotally mounted to the front of the snowmobile chassis, while the back end of the track assembly is pivotally mounted to the chassis via a pair of shock absorbers. Snow and ice buildup interior to the track and encountered shocks are thus reduced.

6 Claims, 4 Drawing Figures

SLIDE RAIL TRACK DRIVE SYSTEM FOR A SNOWMOBILE

BACKGROUND OF THE INVENTION

The present invention relates to snowmobiles and in particular to a slide rail, track drive assembly including a hollow enclosure having side mounted slide rails and about which the endless drive track is mounted and whereby snow and ice build up inside the track is prevented.

Snowmobile track systems are typically driven by a sprocket and chain that are coupled via an intermediate clutch assembly to the engine crank shaft and thence to a mating sprocket driven axle and upon which a pair of track engaging sprockets are mounted so as to cause the track to revolve. Multiple pairs of idler wheels are, in turn, mounted behind the drive sprockets on each side of the track and are coupled to a frame assembly interior to the revolving endless track so as to establish an elongated and supported track contour of sufficient surface area to support the chassis and operator. An example of a typical snowmobile of this type can be seen upon reference to U.S. Pat. No. 4,314,618, assigned to the present assignee.

By leaving the space internal to the track open, however, problems can occur during use, depending upon the snow and weather conditions, through the build up of snow and ice therein. The snow and ice either hampering the operation of the idler sprockets or idler wheels or creating drag due to the added weight. Accordingly, it is an object of the present invention to minimize this potential snow and ice build up through the use of a hollow-framed enclosure in the space internal to the track. Thus, the hollow enclosure now occupies the previously empty space. The track supporting drive sprockets and idler wheels are, in turn, mounted to the sides of the enclosure or on axles passing therethrough in lieu of on a barstock frame.

It is a further object of the present invention to incorporate a slide rail assembly about the side edges of the hollow enclosure and about which the track is supported and revolves. The slide rails are mounted to the enclosure and mate with metal guide clips that are mounted in a space between the various belts to coated rods that join the belts together. The guide clips are also formed so as to mate with the side rails and contain the enclosure in the center of the track via the side forces exerted by the clips against the slide rails.

Additionally, the present invention contemplates a pivotally mounted, shock absorbing suspension system that is coupled between the hollow-framed enclosure and the snowmobile chassis so as to absorb and minimize the transfer of any induced vibration or shock to the driver. A pair of forward ski related shock absorbers further absorb any shock induced at the front end of the machine and thus a relatively smooth ride is obtained.

Partially enclosed wheel supported track systems have previously been used in conjunction with snow vehicles and examples of which can be found upon reference to U.S. Pat. Nos. 2,702,008 and 2,561,716. However, such assemblies differ from the present assembly in that the '088 Patent contemplates a housing which surrounds not only the space interior to the track but also the engine, thereby requiring ventilation louvers. The '716 patent, on the other hand, is directed to a snow tractor that receives it track drive via a drive shaft, thus requiring an opening through the hollow enclosure to the drive sprockets. Neither of such patents, however, disclose a slide rail drive assembly in conjunction with the enclosure. Additionally, it is to be noted that U.S. Pat. Nos. 3,877,534 and 4,314,618 disclose the use of shock absorber suspension systems and that U.S. Pat. No. 4,301,884 discloses a track that is pivotally mounted to the chassis, but which as will become apparent, too, are different from the present combination.

The above objects, advantages and distinctions of the present invention as well as various others will, however, become more apparent upon reference to the following description thereof with respect to the following drawings. It is to be recognized though that while the present invention is described with respect to its presently preferred embodiment, various modifications and changes may be made thereto without departing from the spirit and scope of thereof.

SUMMARY OF THE INVENTION

A snowmobile track assembly wherein an endless drive track surrounds a hollow enclosure that is pivotally coupled to the snowmobile chassis at one end via a yoke coupled to a pair of axle mounted chain driven sprockets and at the other end via a pair of rotatively mounted shock absorbers. Slide rails mating with track mounted metal guide clips support the entire assembly and guide the track as it revolves therearound. Conventional idler wheels also support and guide the track relative to the enclosure and are mounted along the sides of the enclosure. Snow and ice build up are thereby prevented from occuring in the track area, while track encountered shocks are minimized.

DESCRIPTION OF THE PREFERRED EMBODIMENT

Figure 1:
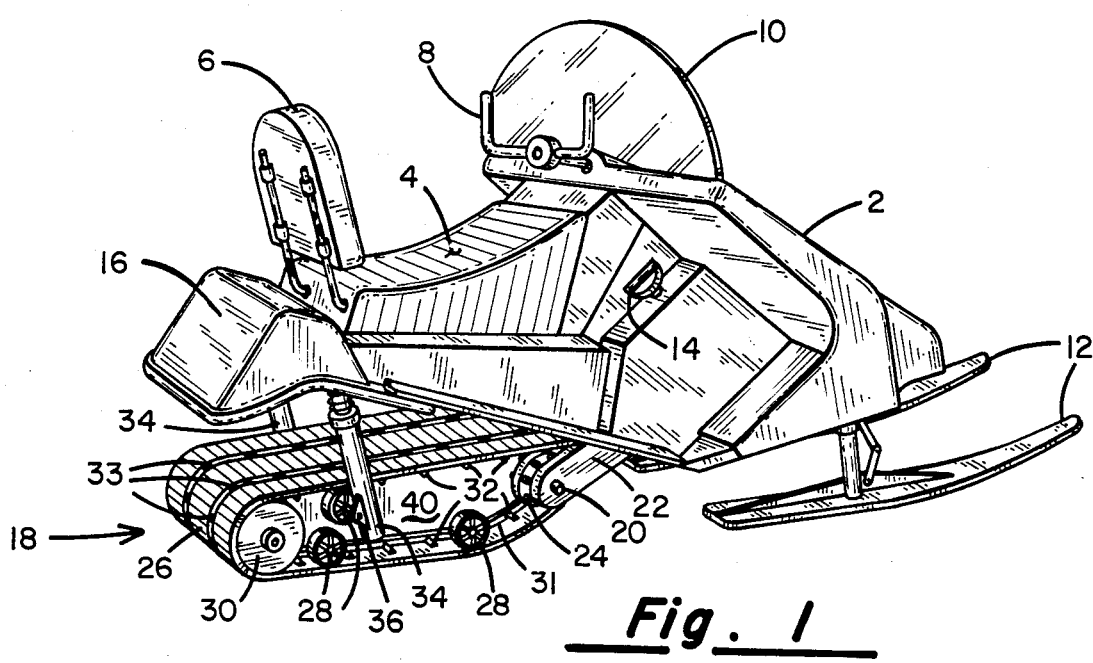
FIG. 1 shows a perspective right side view of a one-man snowmobile relative to the presently improved track suspension system.

Directing attention to FIG. 1, a perspective view is shown of a one-man snowmobile employing the present invention's enclosed slide rail track concept. Specifically, the snowmobile is comprised of a molded chassis 2 having a center-mounted padded seat 4 and a variably inclined padded seat back 6. The details relative to the construction of the seat assembly 6, however, are described in co-pending patent application Ser. No. 498,830, assigned to the present assignee. A steering assembly 8, windshield 10, skis 12, engine pull cord 14 and storage compartment 16 generally complete the chassis 2, although various other complimentary features (e.g. headlights, gauges, etc.) would also be included with the present one-man design.

Mounted beneath the chassis 2 is the drive track assembly 18 and which is pivotally mounted to the chassis 2 at the forward end via a chain and sprocket driven track drive axle 20. Motive power is provided to the track assembly 18 via the crank shaft from the engine and an output shaft from the clutch assembly (both of which are mounted beneath the chassis 2) and which output shaft is coupled to a sprocket and chain contained within the chain housing 22. The chain, in turn, is coupled to a sprocket that is attached to the track drive axle 20 beneath the chain housing 22. Right and left track drive sprockets 24 (only one of which is shown) are fixedly coupled to the track drive shaft 20 and transfer the motive power to the cleated track 26. Pairs of intermediate smooth surfaced track supporting idler wheels 28 are, in turn, mounted between the forward pair of driven drive sprockets 24 and a pair of rearwardly mounted large idler wheels 30. It is to be noted, though, that even though idler wheels 28 and 30 are used in the presently preferred embodiment, the majority of the loading is borne by slide rails 31, but which will be discussed in detail hereinafter.

At this point, it should be noted, too, that the drive sprockets 24 are mounted such that they contact the spaced apart lugs 32 that protrude from the inside surface edges of the outer sections or belts of the three belt drive track 26. The track belts are coupled together via hard fiberous rods 33 that are molded into the rubber track at regular spacings. The lower idler wheels 28, in turn, are mounted so as to contact the outerlying inside surfaces of the outside belts such that the track 26 revolves in an endless fashion without wavering laterally about the lengthwise midline of the track assembly 18 and such as to maintain good ground contact between the outer lugged surface (due to protrusions extending downward from the track connecting rods 33) of the track 26 and the snow covered ground. The track assembly 18 is further pivotally mounted relative to the chassis 2 via a forward frame mounted yoke assembly (not shown) that is coupled to the right and left sides of the chain driven drive axle 20 and an axle that is fixedly mounted to the chassis 2.

Mounted to the rear of the drive track assembly 18 are a pair of pivotally mounted shock absorbers 34 which are pivotally coupled to the track assembly 18 at their lower end and to the chassis 2 at their upper end beneath the storage compartment 16. Specifically, the upper mounting is fixedly coupled via nuts and washers that are coupled to the threaded ends of the shock absorber pistons, while the lower ends of the shock absorbers are coupled to the track assembly 18 via flanges 36. The flanges 36 are mounted to rotate about axles 38 and are spaced away from the track assembly 18 such that the sides of the track 26 do not make contact with the shock absorbers 34. Thus, upon encountering bumps or the like, the chassis 2 may rise and pivot about the axles 38 while the shock absorbers 34 minimize the shock which might otherwise be transferred to the rider, in spite of the padded seat 4. It should be noted, too, that forwardly mounted, independent shock absorbers are mounted on each of the ski assemblies 12, but which assemblies are well known to those of skill in the art. Additionally, it should be noted that idler wheels 28 are also mounted to the axles 38 so as to add further support to the track 26 as it rotates.

Paramount to the present track assembly 18 is a formed hollow enclosure 40 that is generally mounted internal to and coextensive with the track 26 such that it generally determines the contour of the track 26 as it is suspended between the slide rails 31, drive sprockets 24 and idler wheels 28 and 30. This enclosure 40 can better be seen though as to its proportions and mounting relative to the track upon reference to the left side view of FIG. 2 or the cross sectional views of FIGS. 3 and 4.

The enclosure 40 is typically fabricated from two sections of formed sheet aluminum, approximately 1/16 inch thick, that are each bent so as to form the top or bottom and one side of the enclosure and which halves are then welded together. Alternatively, the halves may be riveted together, and should it be necessary, formed stiffeners may be added to the sides and/or top and bottom for further structural support.

The concept though is to provide a hollow enclosure, open only to the through axles which pass through the sides to interconnect the various pairs idler wheels and sprockets such that snow and ice buildup are prevented inside the track 26. In fact, the space within which such buildups can now occur is limited only to the regions of the narrower width outer belts. These, however, are continuously being cleaned via the drive action. Thus, it is no longer necessary for the operator to have to periodically clean the inside of the track 26 of snow and ice, which heretofore has been an occasional problem.

Figure 2:
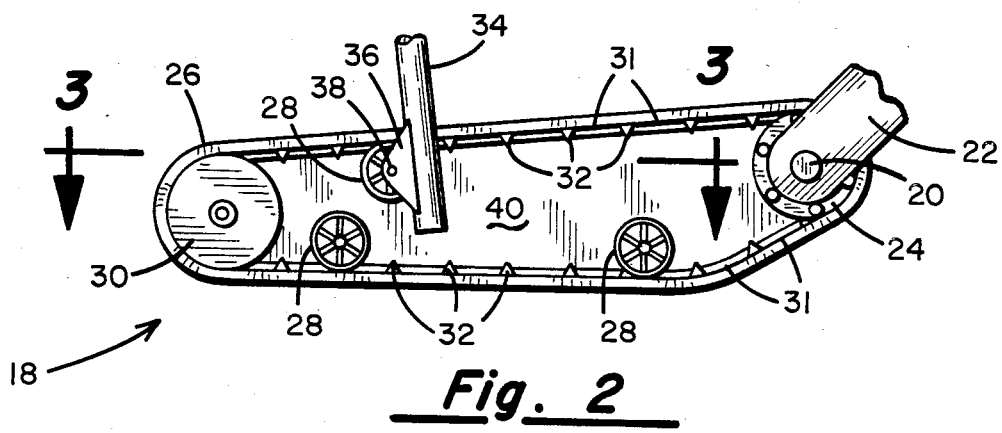
FIG. 2 shows a left side view of the snowmobile of FIG. 1.
Figure 3:
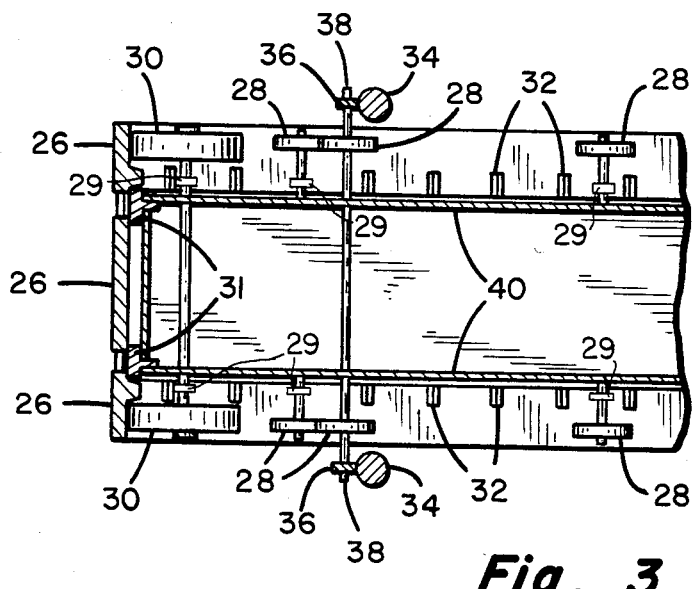
FIG. 3 shows a cross section view through the track assembly of FIG. 2 taken along lines 3—3.

It should be noted too that the present enclosure 40 has been found to be lighter in weight than would otherwise be the case if an aluminum barstock frame were used to support the various idler wheels etc. In that regards, it is to be noted that the present enclosure 40 is provided with a plurality of through bushings and bearings 29 that are mounted to the enclosure sidewalls and through which the various through axles pass to the drive sprockets 24 and some of the idler wheels 28 and 30. In that regards, too, attention is now directed to FIG. 3 wherein a cross sectional view taken along lines 3—3 of FIG. 2 is shown and wherein the relative positioning of the idler wheels 28 and 30 and track lugs 32 can better be seen. From FIG. 3, it is thus to be noted that it is presently contemplated that the enclosure 40 would be essentially unoccupied, except for the various through axles to the drive sprockets 24 and some of the idler wheels 28 and 30. It should be recognized, though, that for various constructions, the through axles for the idler wheels 28 and 30 may be replaced with side mounted axles and which would be rotatively mounted within short gearing containing standoffs from the sides of the enclosure 40. A trade-off must be made, though, between the structural advantages of the heavier through axles, and the lighter side mounted standoffs.

Equally important to the proper operation of the present system is the use of ultra-high molecular weight (UHM) polyethylene slide rails 31. As mentioned, these are mounted to the side edges of the enclosure 40, although additional rails could be added elsewhere, but which presently is not necessary given the typical enclosure width and the strength of the track linking rods 33.

Figure 4:
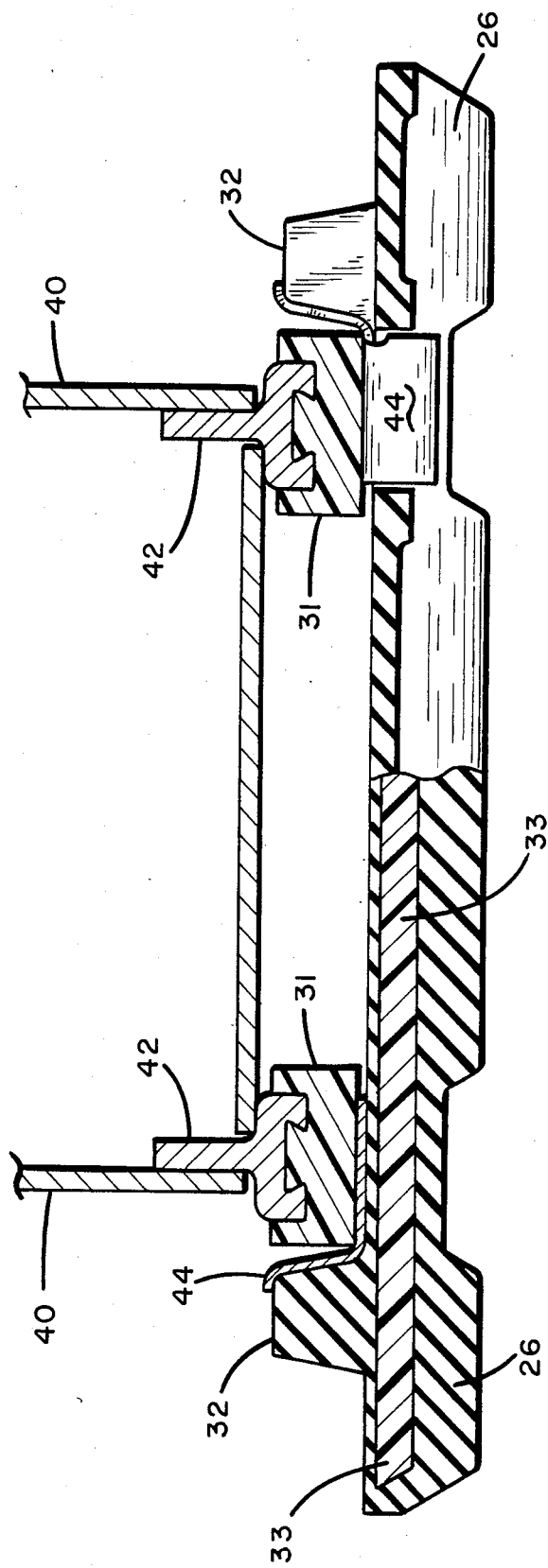
FIG. 4 is an end cross section view of the track relative to the enclosure and slide rails.

Attention is therefore now directed to FIG. 4 wherein a partial vertical cross sectional view (less idler wheels 28) is shown through the track assembly 18. From FIG. 4, it is to be noted that a pair of dovetailed aluminum rails 42 are riveted to the sides of enclosure 40 so as to standoff from the bottom thereof approximately ½ inch. Lengths of UHM rail material with a mating dovetail groove are, in turn, mounted about the aluminum rails 42 and attached thereto via countersunk screws. The slide rails 31 thus substantially support the chassis 2 relative to the track 26. Further, even though the rails 31 in FIGS. 1 and 2 are shown as extending around the entire side edges of the enclosure 40 they may alternatively be mounted only to the lower edges of the enclosure 40. Accordingly, it should be apparent, too, that the number and spacing of idler wheels 28 may also be adjusted.

From FIG. 4, it is to be noted, too, that the slide rails 31 are spaced away from the enclosure 40 about one inch and are mounted over the track connecting rods 33 between the center and outer sections of track belting. In order to protect this region from wear, smooth surfaced metal guide clips 44 are crimp mounted about the sections of rod 33 such that the rails 31 ride thereover. The sides of the guide clips 44 also extend up and over the lugs 32 so as to contain the enclosure above the center section of track belting and between the lugs 32 mounted to each side section of belting. Snow gripping windows, in addition to the cleated effect of the rods 33, are also formed in the space between the sections of rod 33, and within which snow and ice buildup are minimized due to the metal clips 44, and which become heated during use so as to melt the snow and which also aids in the lubrication of the slide rails 31. Thus, the enclosure 40 and slide rails 31 provide a lighter weight, guided track drive with fewer moving parts and which is much less susceptible to snow and ice buildup.

While the present invention has been described with respect to its presently preferred embodiment, it is again to be recognized that various modifications or changes may be made thereto, without departing from the spirit and scope of the present invention. It is, therefore, contemplated that the following claims should be interpreted so as to include all such equivalent structures as might be included within the spirit and scope of the present invention.

What is claimed is:

1. An improved track suspension system for a snowmobile including an endless drive track suspended from a snowmobile chassis, the improvement comprising:
   (a) a hollow enclosure mounted interiorly of said endless drive track having top, bottom and end outer surface contours substantially coextensive with said endless drive track so as to occupy substantially all of the interior space thereof and having right and left exposed sides, the edges of which sides each include a slide rail mounted to a portion thereof for each engaging a mating smooth interior surface of said track;
   (b) at least one driven sprocket mounted to the side of said enclosure in drive engaging relation to said track whereby motive power is supplied to said track;
   (c) a plurality of idler wheels mounted to the sides of said enclosure for engaging smooth lateral interior surfaces of said track and supporting and guiding said track in relation to said enclosure and slide rails;
   (d) pneumatic shock absorbing means coupled to one end of said enclosure and to said chassis; and
   (e) whereby in combination said improved track suspension system resiliently supports the snowmobile chassis above a substantially snow and ice free endless drive track.

2. Apparatus as set forth in claim 1 including a plurality of bearing supported through axles extending through the sides of said enclosure and to which through axles said idler wheels and said driven sprocket are attached.

3. Apparatus as set forth in claim 1 wherein each of said slide rails surrounds the peripheral edge of its associated side.

4. Apparatus as set forth in claim 1 wherein each of said slide rails is mounted to an upper and a lower portion of the peripheral edge of its associated side.

5. Apparatus as set forth in claim 1 wherein each of said slide rails is comprised of a dovetailed member attached to the edge of one of said sides and a mating slide member fabricated from a relatively high molecular weight polymer material mounted thereto, and wherein the slide member of each said slide rails rides over a plurality of metallic guide clips that extend laterally from a plurality of raised lugs projecting from the interior surface of said drive track.

6. An improved track suspension system for a snowmobile including an endless drive track suspended from a snowmobile chassis, the improvement comprising:
   (a) a hollow enclosure mounted interiorly of said endless drive track having top, bottom and end outer surface contours substantially coextensive with said endless drive track so as to occupy substantially all the interior space thereof and also having right and left exposed sides, the edges of which sides each include a slide rail mounted to a portion thereof for engaging a mating predetermined smooth interior surface of said drive track;
   (b) at least one driven sprocket mounted to a through axle passing through the sides of said enclosure and in drive engaging relation to said track whereby motive power is supplied to said track;
   (c) a plurality of idler wheels, pairs of which are mounted in opposed relation to each other on individual through axles passing through the sides of said enclosure and each of which idler wheels engage a smooth endless interior surface of said drive track so as to support and guide said track in relation to said enclosure and slide rails; and
   (d) pneumatic shock absorbing means coupled to one end of said enclosure and to said chassis; and
   (e) whereby in combination said improved track suspension system resiliently mounts the snowmobile chassis above a substantially snow and ice free endless driven track.

* * * * *